United States Patent [19]

Fette et al.

[11] 4,373,191

[45] Feb. 8, 1983

[54] ABSOLUTE MAGNITUDE DIFFERENCE FUNCTION GENERATOR FOR AN LPC SYSTEM

[75] Inventors: Bruce A. Fette, Mesa; Bruce D. Harte, Scottsdale; Bill E. Tennyson, Paradise Valley, all of Ariz.

[73] Assignee: Motorola Inc., Schaumburg, Ill.

[21] Appl. No.: 205,537

[22] Filed: Nov. 10, 1980

[51] Int. Cl.[3] .......................... G06F 15/31; G10L 1/00

[52] U.S. Cl. .................................. 364/724; 179/1 SA

[58] Field of Search .......... 364/724; 179/1 SA, 1 SC; 328/167

[56] References Cited

U.S. PATENT DOCUMENTS

| | | | |
|---|---|---|---|
| 3,639,739 | 2/1972 | Golden et al. | 364/724 |
| 3,829,670 | 8/1974 | Kebabian | 328/167 X |
| 3,947,638 | 3/1976 | Blankinship | 179/1 SA |
| 4,230,906 | 10/1980 | Davis | 179/1 SA |

*Primary Examiner*—Jerry Smith

*Attorney, Agent, or Firm*—Eugene A. Parsons

[57] ABSTRACT

An absolute magnitude difference function (AMDF) generator for a linear predictive coding (LPC) system including a high speed low pass filter, with the AMDF generator formed on a single semiconductor chip including a data bus, control bus, memory, and a plurality of arithmetic logic units (ALU) for performing a plurality of functions in a reduced number of steps.

12 Claims, 10 Drawing Figures

ABSOLUTE MAGNITUDE DIFFERENCE FUNCTION GENERATOR FOR AN LPC SYSTEM

BACKGROUND OF THE INVENTION

Processing voice signals in a linear predictive coding (LPC) system provides certain information which specifically decribes the voice signal being processed. Part of the information required to specifically describe the voice signal is a quantity referred to as the pitch. In LPC systems the pitch is determined by means of an absolute magnitude difference function (AMDF) generator or analyzer, the operation of which will be described in more detail presently.

In the prior art, integrated circuits formed on a single semiconductor chip generally contain only a single arithmetic logic unit (ALU) and signals are passed through the ALU a number of times to provide a single function. This prior art apparatus and method of providing certain arithmetic functions is very slow and, in voice processing systems may be too slow.

SUMMARY OF THE INVENTION

The present invention pertains to an integrated circuit on a single semiconductor chip including a data bus, a plurality of memory elements consisting of shift registers, or random access memories, with each shift register of the plurality having a plurality of stages different than the plurality of stages for each of the other shift registers, a plurality of storage devices equal to the number of shift registers in said plurality and each device being associated with a different one of said plurality of shift registers, a subtracting circuit and an adding circuit in a three input arithmetic logic unit, all of which are operated in a proper sequence to low pass filter a digitized data signal applied thereto.

The low pass filtering is the first step in generating an absolute magnitude difference function and the AMDF generator formed on a single semiconductor chip further includes a random access memory, an absolute value determining circuit, a plurality of estimated function storage circuits and bit shifting circuitry which are operated in cooperation with the adding and subtracting circuits to provide a plurality of outputs which, in cooperation, define an absolute magnitude difference function and from which function the period of the pitch can be determined.

The use of a plurality of ALU circuits operating substantially simultaneously and the organization of the integrated circuit on the semiconductor chip greatly improves the speed of the process without substantially increasing the chip size.

It is an object of the present invention to provide an absolute magnitude difference function generator in a new and improved integrated circuit on a single semiconductor chip.

It is a further object of the present invention to provide an absolute magnitude difference function generator in an integrated circuit which is substantially faster than prior art circuits without substantially increasing the chip size.

It is a further object of the present invention to provide a new and improved high speed digital low pass filter in an integrated circuit on a semiconductor chip.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
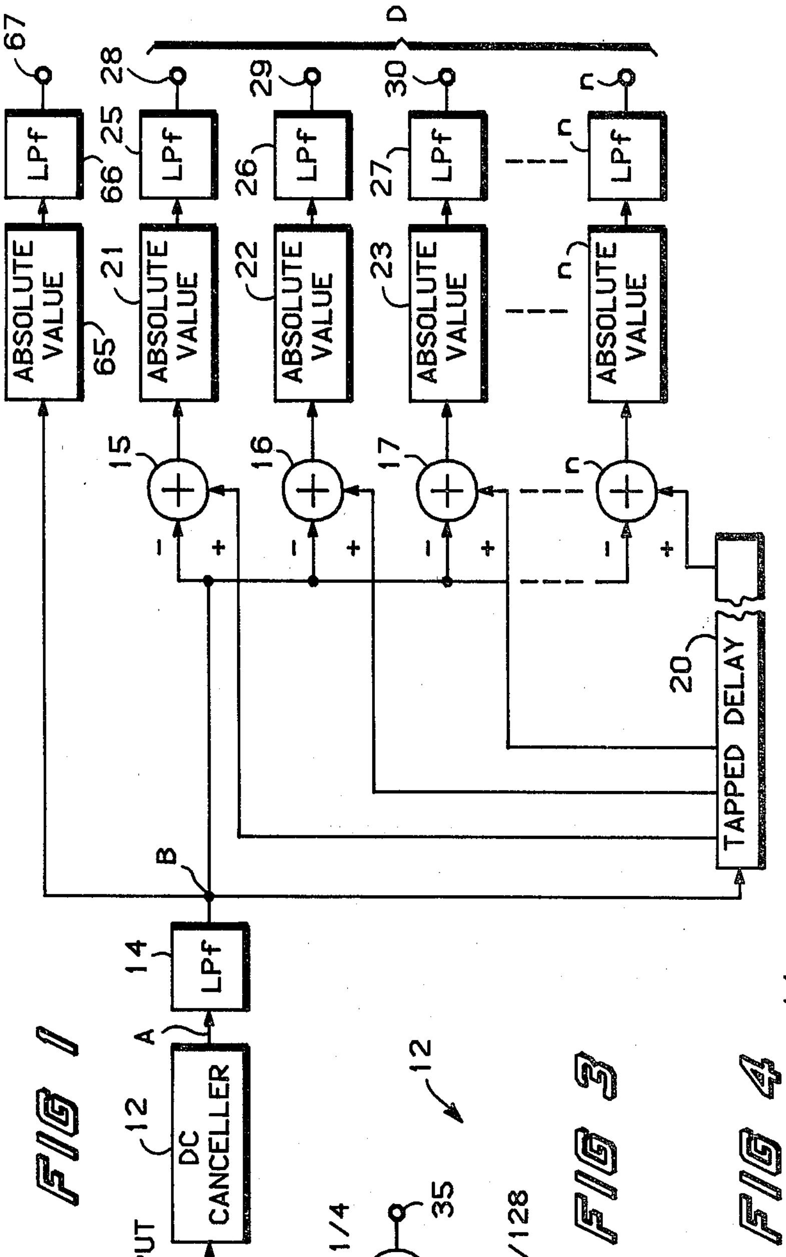
FIG. 1 is a functional block diagram of an absolute magnitude difference function generator.
Figure 2D:
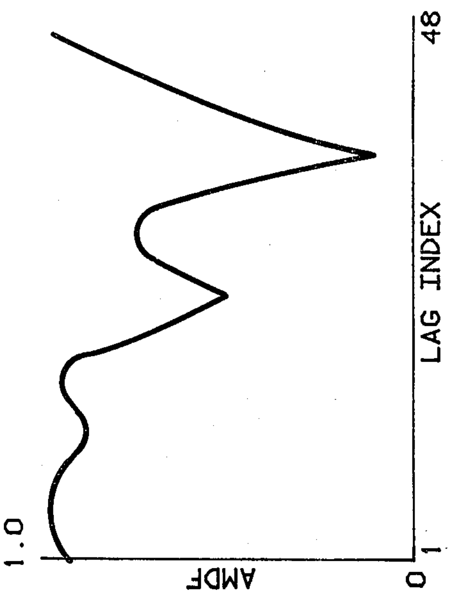
FIGS. 2A, B, C, and D illustrate typical waveforms present at four different points in the apparatus of FIG. 1.
Figure 2A:
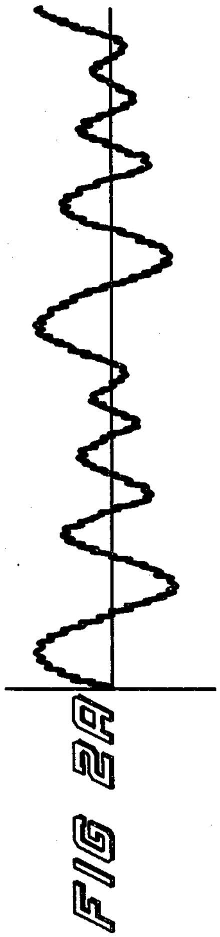
Figure 2B:
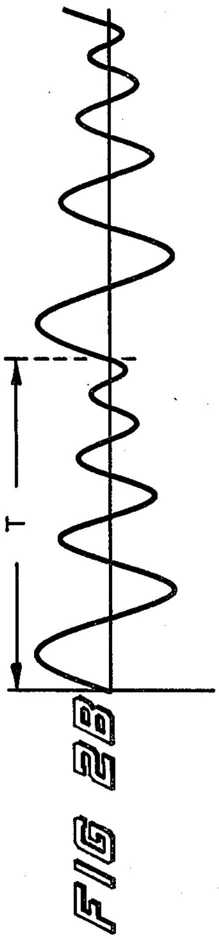

Referring specifically to FIG. 1, an analog functional block diagram is utilized to illustrate the operation of an AMDF generator. An input terminal 10, adapted to have a voice signal applied thereto, is connected through a DC canceller 12 to a low pass filter 14. Since the voice signal is a reoccurring signal varying about a reference value, the DC canceller 12 ensures that the reference value is zero so that no DC is present and errors which could be caused by the presence of DC in the signal are eliminated. FIG. 2A illustrates a typical voice signal waveform available at the output of the DC canceller 12 and illustrating the reoccurring characteristics. In FIG. 2A the basic waveform of the voice signal consists of the fundamental pitch and all harmonics thereof. The low pass filter 14 is utilized to remove the higher harmonics so that a relatively clean reoccurring signal (see FIG. 2B) is available.

The frequency of reoccurrence of the remaining signal is the pitch frequency and the time, T, from the beginning to the end of the reoccurring wave is the period of the pitch frequency. In general, the pitch frequency of a male voice lies in a range of approximately 50 to 150 Hertz (T equals 20 milliseconds to 6 milliseconds), the pitch frequency of a female voice lies in the range of 100 to 250 Hertz (T equals 10 milliseconds to 4 milliseconds) and the pitch frequency of a child's voice lies in the range of 200 to 400 Hertz (T equals 5 milliseconds to 2.5 milliseconds). The absolute magnitude difference function provides the information required for determining the period of the voice signal being processed or analyzed.

The reoccurring signal from the low pass filter 14 is applied directly to one input of each of a plurality of combining circuits 15, 16, 17, . . . , n. The output of the low pass filter is also applied to the input of a tapped delay line 20 with each combining circuit having a second input connected to a different tap of the delay line 20. The combining circuits 15 through n subtract the delayed signal supplied by the tapped delay line 20 from the signal supplied by the low pass filter 14. Each tap of the delay line 20 delays the signal applied thereto a different amount and the combining circuits 15 through n essentially compare the delayed signal to the undelayed signal. If the reoccurring signals are exactly the same the combining circuit which receives a signal delayed by exactly the amount T will have a zero output. Since these exact situations rarely, if ever, occur the combining circuit 15 through n providing the lowest output generally indicates that the amount of delay of the signal applied thereto by the delay line 20 is close to the value T.

The outputs of the combining circuits 15 through n are applied through absolute value determining circuits 21, 22, 23, . . . , n, respectively, and low pass filters 25, 26, 27, . . . , n, respectively, to output terminals 28, 29, 30, . . . , n, respectively. Since the difference between the signals in the combining circuits 15 through n might be in either direction (positive or negative) the absolute value determining circuits 21 through n ensure that all of the values are in the same direction and the low pass filters 25 through n smooth the outputs and remove any false dips which might be caused by noise or other interference. Combining the signals at the output terminals 28 through n provides an absolute magnitude difference function, a typical example of which is illustrated in FIG. 2D. It will of course be understood that the number of taps in the delay line 20 and the number of combining circuits 15 through n will be determined by the accuracy desired. It will also be understood by those skilled in the art that the functional block diagram illustrated in FIG. 1 is utilized simply to illustrate the manner in which an absolute magnitude difference function is generated and does not form a portion of this invention.

Figure 3:
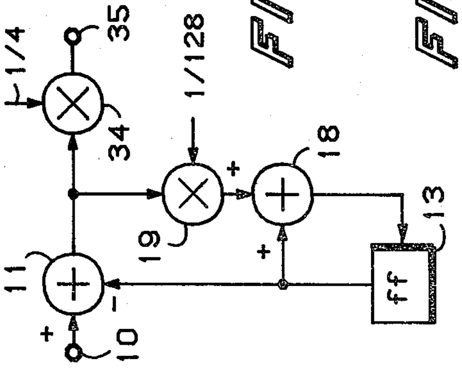
FIG. 3 is a functional block diagram of a DC cancelling circuit.

In the present invention it is desirable to work with digital signals and, accordingly, the voice signal supplied to the input (as at terminal 10) is a digital signal. In the present embodiment, for example, the analog voice signal is sampled once every 125 microseconds which equals 8000 samples per second. Each sample is represented by a 12-bit word. Thus, each of the functions represented by the blocks of FIG. 1 must be provided in the form of a digital circuit which will operate on the 12-bit words representing each sample. A functional block diagram for a DC cancelling circuit 72 is illustrated in FIG. 3. The operation of this circuit is generally well known to those skilled in the art but it will be reviewed briefly herein.

Referring specifically to FIG. 3, the input terminal 10 is connected to a positive input of a combining circuit 11, a second, negative input of which is connected to the output of a flip-flop, or memory, stage 13. The output of the combining circuit 11 is connected to one input of a multiplier 19 and to one input of a second multiplier 34. A second input to the multiplier 19 has a 1/128 signal applied thereto so that the signal from the combining circuit 11 is actually divided by 128. The output of the multiplier 19 is applied to a positive input of a combining circuit 18, a second positive input of the multiplier 18 is connected to the output of the flip-flop stage 13. The multiplier 34 has a second input with a $\frac{1}{4}$ signal applied thereto, which divides the DC cancelled output signal by 4 prior to application to the LPF 14 to insure that the amplitude of the signal remains less than unity.

Figure 4:
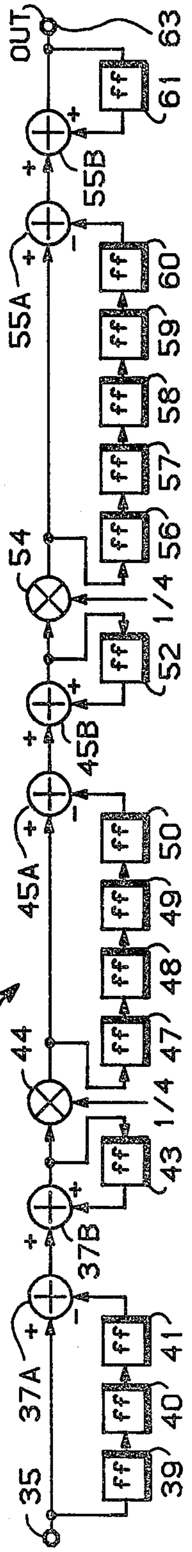
FIG. 4 is a functional block diagram of a finite impulse response digital low pass filter.

The low pass filter of FIG. 4 has an input terminal 35 connected directly to a combining, or subtracting, circuit 37A and to an input of a first shift register stage or delay 39. Throughout this disclosure whenever a delay stage is discussed it will be understood by those skilled in the art that many devices other than a flip-flop might be utilized to provide the required delays, e.g. a random access memory or other memory devices, and the flip-flop is shown only because of its simplicity and ease of understanding. The output of the shift register stage 39 is connected in tandem through two more stages 40 and 41 to a second input of the combining circuit 37A. The three delay stages 39, 40 and 41 form a first memory element. The direct connected input signal and the three stage delayed input signal are subtracted, or compared, in the combining circuit 37A and the difference signal is added to the output of a shift register stage 43 in a combining, or adding, circuit 37B, the input of which is connected to the output of the combining circuit 37B. The output of the combining circuit 37B is also supplied through a multiplier 44, similar in operation to multiplier 34, to one input of a combining, or adding, circuit 45A. The output of multiplier 44 is also supplied through four stages of delay 47, 48, 49 and 50, which is a second memory element, to a second input of the combining circuit 45A. The signal representing the difference between the undelayed and delayed signals, obtained from the circuit 45A, is added to the output of a shift register stage 52, in a combining, or adding, circuit 45B to provide an output signal from the combining circuit 45B. The output signal from the combining circuit 45B is connected to the input of the shift register stage 52, through a multiplier 54, similar in operation to multiplier 34, to a first input of a combining, or subtracting, circuit 55A and through the multiplier 54 and five shift register stages 56 through 60, which is a third memory element, to a second input of the combining circuit 55A. The signal representing the difference between the undelayed and delayed signals applied to the combining circuit 55A, which is obtained from the circuit 55A, is added to an output signal from a shift register stage 61 in a combining, or adding, circuit 55B to provide an output signal which is available at an output terminal 63. The output signal from the circuit 55B is also applied to the input of the stage 61. The three single delay stages 43, 52 and 61 are all storage devices which are illustrated as flip-flops but may be a single RAM or other memory device having portions which may be associated with the three memory elements as described.

The frequency response of the specific three stage low pass filter described is approximately 1 kilohertz and is, therefore, satisfactory for use in voice processing systems. However it will be understood by those skilled in the art that satisfactory low pass filters can be constructed with more or less stages and while the three stages illustrated in the described filter contain three, four and five delay stages, more or less delay stages may be incorporated in each of the filter stages. Further, while the stages of the present filter are connected in ascending order it will be understood that the stages might be connected in any desired or convenient sequence.

Figure 2C:
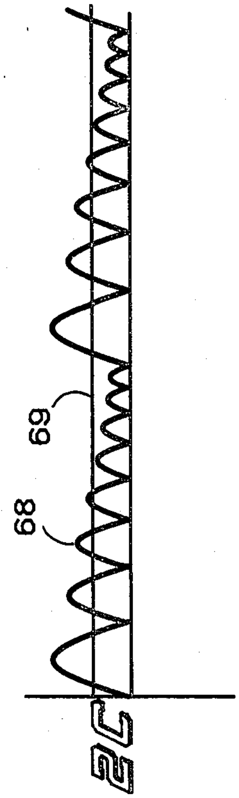

One additional piece of information, required in voice processing systems, is developed in the functional diagram of FIG. 1. This additional piece of information is the average energy of the low passed speech waveform, herein referred to as ISTU. The output of the low pass filter 14 is connected to an absolute value determining circuit 65 and the output thereof is connected through a low pass filter 66 to an output terminal 67. A typical absolute value signal appearing at the output terminal of the absolute value circuit 65 is illustrated by the waveform 68 in FIG. 2C and the low pass filtered version of the signal appearing at terminal 67 is illustrated in the waveform 69 of FIG. 2C. While the ISTU signal does not form a portion of the absolute magnitude difference function, it is easily available, as shown in FIG. 1, and, therefore, is included as a portion of the structure to be described.

Figure 5:
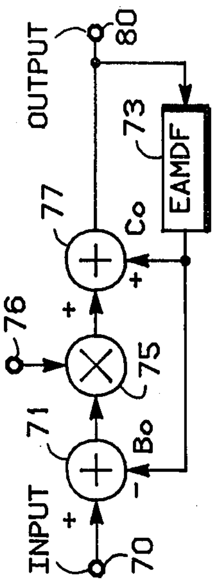
FIG. 5 is a functional block diagram of a second type of infinite impulse response digital low pass filter.

A functional block diagram for a typical digital low pass filter to be used for the low pass filters 25 through n and 66 is illustrated in FIG. 5. An input 70 is connected directly to one input of a combining circuit 71, which may again be referred to as a subtracting circuit because of its arithmetic function, and a second input of the circuit 71 is connected to the output of an estimated AMDF storage circuit 73. The difference signal at the output of the combining circuit 71 is applied to a multiplying circuit 75 which essentially determines the response of the low pass filter. In the functional diagram of FIG. 5 the circuit 75 is illustrated as a circuit which multiplies the input from the combining circuit 71 by a signal applied to a terminal 76. The signal at the terminal 76 is based on the sampling rate of the incoming signal for the entire generator and, for example, is 1/64 for the preferred embodiment described herein. A 1/64 signal applied to the circuit 75 provides a bandwidth of approximately 10 Hz. If the signal were changed to 1/32 the bandwidth would change to 20 Hz. Any desired signal compatible with the operation of the remaining circuitry might be utilized. It will of course be understood by those skilled in the art that the circuit 75 might also be a dividing circuit and the signal at the terminal 76 would then be a whole number, e.g. sixty-four.

The output of the circuit 75 is applied to one input of a combining circuit 77, which may be referred to as an adding circuit because of its arithmetic function, and a second input of the circuit 77 is connected to the estimated AMDF storage circuit 73. The output of the combining circuit 77 is available at an output terminal 80 as an estimate of the absolute magnitude difference function (EAMDF), and is also applied to the input of the storage circuit 73. Thus, it can be seen that the low pass filter of FIG. 5 supplies an updated EAMDF signal at the output terminal 80 which is equal to the previous EAMDF signal (from the storage circuit 73) divided by the number at the terminal 76 plus the input signal divided by the number available at the terminal 76. As mentioned previously, by carefully selecting the number supplied to the input terminal 76 the desired response for the low pass filter can be obtained.

Figure 6:
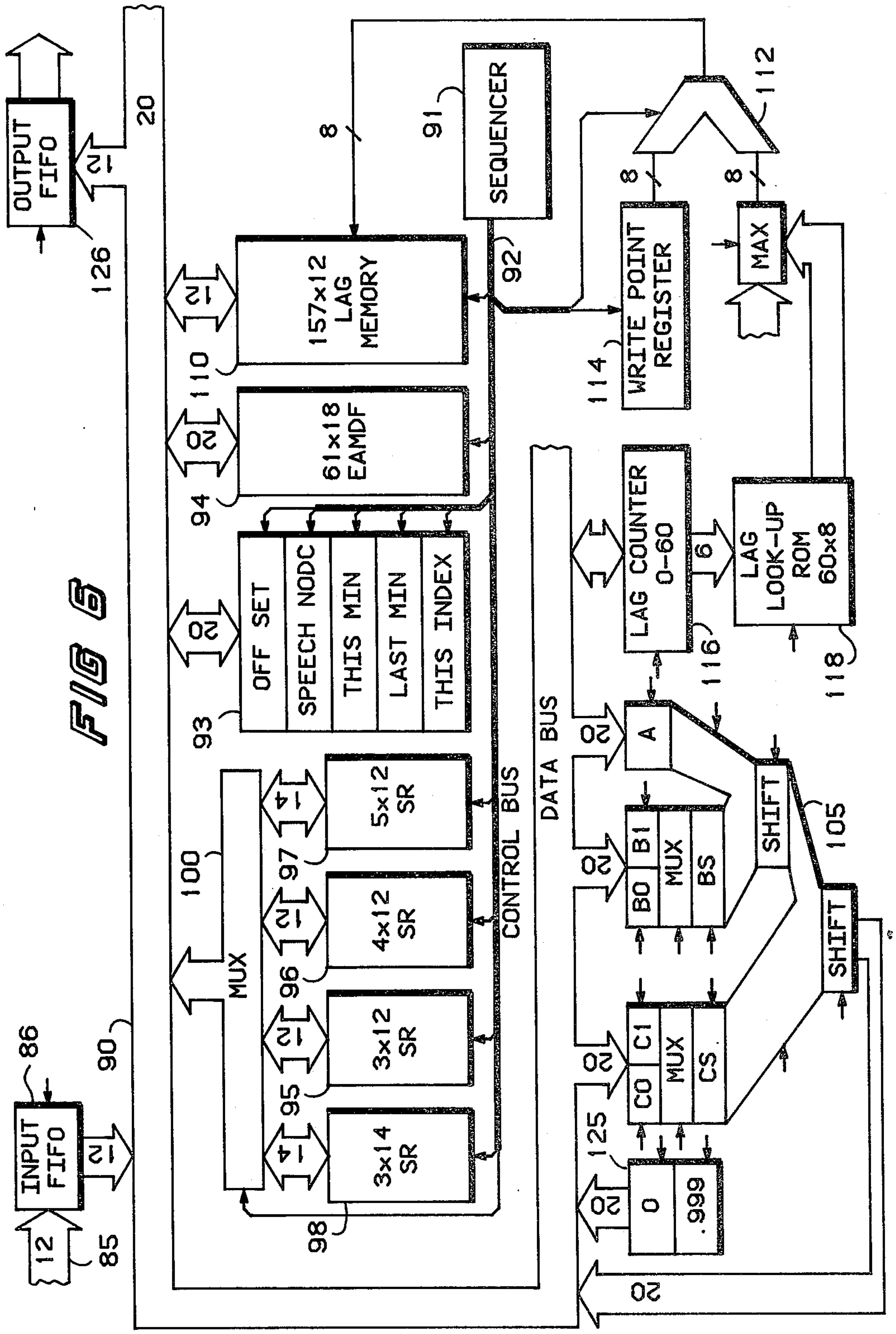
FIG. 6 is a block diagram of a digital absolute magnitude difference function generator embodying the present invention.

Referring specifically to FIG. 6, an embodiment of an absolute magnitude difference function generator formed on a single semiconductor chip is illustrated. While the present chip is constructed using CMOS technology, it will be understood by those skilled in the art that other technologies might be utilized. Since the various components to be described are well known to those skilled in the art, a complete description of the inner construction and inner workings of each of the components will not be proffered herein. Also, each 12-bit input word representing a sample is transmitted from component to component and operated upon in parallel but it should be understood that a serial operating system might be devised, although it is believed at this time that such a system would be slower than the parallel system illustrated.

The input digital data signal is supplied at an input 85 to a two word input register 86. The register 86 is a first-in first-out, 12-bit by two word register, the output of which is connected to a data bus 90. There are two counters (not shown) associated with the input register 86, the first of which determines when the register is full and the second of which counts the number of times the register is read and determines when it is empty. Both counters are reset by a signal from a sequencer 91 on a control bus 92. The data bus 90 is 20 bits, or lines, wide with the lines being designated 0 through 19 and the zero$^{th}$ line being the sign bit. The control bus 92 is fourteen bits, or lines, wide with the lines being designated 0 through 13 and the zero line being the least significant bit while the line 13 is a jump/move control.

Several temporary registers, illustrated as a single block 93, are connected to the data bus 90. The temporary registers 93 are all latches and are used for direct storage of a DC offset signal (toffset), a speech signal after removal of DC (speech no DC), a last minimum and this minimum signal and a this index signal.

An Estimated Absolute Magnitude Difference Function or EAMDF shift register is connected to the data bus 90, which shift register is a sixty-one word by 18-bit register located one bit down on the data bus 20. The register 94 is sign extended to bit zero when being sourced onto the data bus 20. Information is clocked through the register 94 by a destination microcode from the control bus 92.

The initial low pass filter (LPF 14 in FIG. 1) consists of four shift registers 95, 96, 97 and 98 coupled through a multiplexing circuit 100 to the data bus 90. The sizes of the registers 95, 96 and 97 are three words by twelve bits, four words by twelve bits and five words by twelve bits, respectively, and the size of the register 98 is three words by fourteen bits. The registers 95, 96 and 97 are sign extended when being sourced onto the data bus 20. All of the registers 95 through 98 are clocked by a destination instruction from the sequencer 91 on the control bus 92 and by their own individual destination codes.

An adder/subtractor ALU, designated 105, is twenty bits wide. It performs 2's complement addition or subtraction. It is in reality a two stage adder (two ALUs in tandem) where the output of the first stage is used as an input to the second stage. Input registers for inputs to the two stages are denoted A, B1, B0, C1 and C0. Either of the B1 or B0 inputs may be applied through a multiplexing circuit to a BS (slave) register and either of the inputs C0 or C1 may be applied through a multiplexing circuit to a CS (slave) register. The first stage of the ALU 105 can perform either an A+B1, A−B1, A−B0, or A+0 operation. On its way to the input of the second stage one of four things can happen to the output from the first stage, depending on the specific ALU code involved (instructions from the sequencer 91). The signal from the first stage is either transferred as is, shifted four bits (divide by sixteen), shifted six bits (divided by sixty-four), or its absolute value (1's complement) is determined. The second stage of the ALU 105 either adds 0 or C0 or subtracts C1 to obtain the final output signal.

The adder/subtractor ALU 105 is controlled by a 3-bit code from the sequencer 91 on the control bus 92 to perform the following operations;

A+B1+0

A−B1+0

A+0

(A−B0)/14+C0

A+0−C1

A+B1+0

A−B0+0

(A−B0)/64+C0

A−B0+C0

The output signal from the second stage may be shifted by 0, 2 or 7 bits (i.e. sum, sum/4, or sum/128) onto the data bus 90. In general the ALU 105 performs the function A±B±C, where A is a signal applied to a first input, B is a signal applied to a second input and C is a signal applied to a third input.

The A input register for the adder/subtractor circuit 105 is master/slave and may be loaded from the output of the circuit 105. The B0, B1, C0, and C1 input registers are latches but are piped and transferred by way of the multiplexing circuit to the BS and CS registers which are sets of D flip-flops and, therefore, these registers also can be loaded from the output of the circuit 105. Operation of the adder/subtractor circuit 105 is initiated by storing a signal in the A register.

A lag memory 110 is also connected to the data bus 90. The memory 110 is a 157 word by 12-bit random access memory (RAM). There are two counters (not shown) associated with the memory 110. The read/-write operations of the memory 110 are controlled by a plurality of registers which are coupled to the memory 110 by way of an adding circuit (ALU) 112. A write point register 114, in conjunction with the circuit 112, forms a 0–156 state counter and is incremented each time a word is written into the memory 110. A lag counter 116 is a 0–60 state counter that is used during reading of the memory 110. The fifty-ninth state of the counter 116 is detected by the instruction from the sequencer 91 and flags the sixtieth word read from the memory 110. The lag counter 116 is reset by an instruction from the sequencer 91. The counter 116 addresses a read only memory (ROM) 118, which forms a lag lookup table, to get a negative offset to add to the signal from the register 114 to obtain the read address of the memory 110. If the read address is negative, the number 157 is added to the address to get it back into the address space of the memory 110. The lag counter 116 is incremented by an instruction from the sequencer 91 on the control bus 92. The write point register 114 is reset by an instruction from the sequencer 91 on the control bus 92.

A two word register 125 is coupled to the data bus 90 for applying either of two words representative of 0 and 0.999 to the data bus during the calculations of the minimums.

An output register 126 is a first-in first-out, 12 bit by 63 word shift register, the output of which is available to be supplied to additional voice processing equipment such as a commercially available 68000 microprocessor. The input of the register 126 is connected to the data bus 90 for receiving digital words in response to sequencer 91 signals.

In the operation of the circuitry illustrated in FIG. 6, any DC is first removed from the data signal supplied to the data bus 90 from the register 86. This is accomplished by operating on each input word as it is supplied from the register 86. The word supplied from the register 86 is clocked into the register A of the ALU 105 and whatever word is stored in the temporary register labeled offset, of the register block 93, is clocked into the B1 register of the ALU 105. The ALU 105 calculates the difference between A and B1, which difference signal is transmitted through the first bit shifting circuit of the ALU 105 and is available at the input of the second bit shifting circuit. The difference signal at the input of the second bit shifting circuit of the ALU 105 is available for two separate operations. First the difference signal is shifted two places (divide by 4) and supplied by way of the data bus to the speech no DC temporary register in the register block 93. Second the difference signal is shifted seven places (divide by 128) and supplied to the A register of the ALU 105. The word which was present in the offset register is still available in the B1 register of the ALU 105 and at this time the ALU 105 is instructed to add the two signals and supply them unshifted to the offset register in the register block 93, where the new signal is used to update or replace the signal previously in the offset register. Thus, the input word, with DC removed and reduced by one-fourth to ensure that it does not exceed unity, is available in the temporary register, speech no DC, for application to the low pass filter.

For the operation of the low pass filter (illustrated functionally in FIG. 4) the word stored in the speech no DC register, block 93, is clocked into the A register of the ALU 105 and, through the multiplexer 100, into the shift register 95. When the word is clocked into the shift register 95 a word is clocked out which has been delayed by three bits and this word is clocked into the register B0 of the ALU 105. The shift register 98 is essentially three one word registers each of which is associated with one of the registers 95, 96, or 97. A word is clocked out of the portion of the shift register 98 associated with the shift register 95 and is clocked into the input register C0 of the ALU 105. The ALU calculates the difference between the two signals applied to the input registers A and B0 and the sum of the difference output and the input to the register C0 and supplies a word representative of the sum, by way of the data bus 90 to the portion of the shift register 98 associated with the shift register 95. The ALU 105 also shifts the signal representative of the sum by two places (divide by 4) and supplies the shifted word to the input register A of the ALU 105, as well as to the shift register 96 by way of the data bus 90 and the multiplexing circuit 100. A word which is delayed by four bits or samples is shifted out of the shift register 96 and supplied by way of the multiplexing circuit 100 and data bus 90 to the input register B0 of the ALU 105. A second portion of the shift register 98, which is the storage device associated with the shift register 96, supplies a word by way of the data bus 90 to the input register C0. The ALU 105 subtracts the two signals applied to the A and B0 registers, adds the difference to the signal in the C0 register, and supplies an unshifted word representative of the sum, by way of the data bus 90, to the second portion of the shift register 98. The ALU 105 also shifts the word representative of the sum by two bits (divide by 4) and supplies it by way of the data bus 90 to the A register of the ALU 105 and to the shift register 97. A word is shifted out of the shift register 97 which is delayed by five bits or samples and this word is supplied by way of the multiplexing circuit 100 and data bus 90 to the B0 register of the ALU 105. A third portion of the shift register 98, associated with the shift register 97, supplies a word to the C0 register of the ALU 105 and the ALU 105 calculates the difference between the two input words from the registers A and B0 and the sum of the difference and the input from the register C0. An unshifted word representative of the sum is supplied, by way of the data bus 90, to the third portion of the shift register 98, to the B1 register of the ALU 105 and to the lag memory 110. Thus, words representative of samples having the DC removed and low pass filtered are stored in the lag memory 110.

The lag memory 110 with the lag counter 116, ROM 118 and adding device 112 operate as a tapped delay line to provide substantially any delay desired from zero through 20 milliseconds. In the present embodiment, for example, the last word written into the lag memory 110 will have zero delay while the word written in 156 samples earlier will have 20 milliseconds delay. In the present embodiment sixty different delays are selected with the first delay being 2.5 milliseconds, the last delay being 20 milliseconds and the remaining delays spaced logarithmically therebetween. Each delayed word, in its turn as determined by the sequencer 91, is transmitted by way of the bus 90 to the input register A of the ALU 105. The ALU 105 determines the difference between the low pass filtered word in the register B1 and the delayed word in the register A and, after determining the absolute value provides a word at the output representative of the absolute value of the difference, which word is transmitted by way of the bus 90 to the register A of the ALU 105. A first word is removed from the register 94 and clocked into the input registers B0 and C0 of the ALU 105. The word in the B0 register is subtracted from the word in the A register, shifted six bits (divide by 64) and transmitted by way of the data bus 90 to the A register. The word in the C0 register is added to the new word in the A register and an unshifted word representative of the sum is transmitted by way of the data bus to the position in the register 94 from which the first word was taken and is also written into the output register 126. In a similar fashion each of the other fifty-nine delayed words in the memory 110 are subtracted from the undelayed word, the absolute value is determined and low pass filtered and the estimated AMDF word is stored in the register 94 and the output register 126.

When the first EAMDF signal is obtained, it is read into the register A of the ALU 105 and the word representing 0.999 in the register 135 is read into the input register C1 of the ALU 105. The difference between these two words is obtained and if the EAMDF signal is smaller it is stored in the "this minimum" temporary register 93 while the index number for that number is obtained from the lag counter 116 and stored in the "this index" temporary register 93. As each succeeding EAMDF word is obtained it is clocked into the A register and the last minimum is clocked into the C1 register of the ALU 105, the minimum of the two is determined and that minimum with its index is written into the register 93. When the final minimum of the sixty EAMDF signals is obtained, it and its index are written into the output register 126 thus, the sixty-three words in the output register 126 are: the word representing the ISTU value, sixty words representing the sixty EAMDF values, a word representing the value of the minimum of the sixty EAMDF signals, and a word representing the index for the minimum value.

The sequencer 91 is constructed to order sixty delayed samples, or words, from the log memory 110 to be processed, as described, in the ALU 105 between each sample supplied by the low pass filter 14. Each delayed sample is subtracted from the sample presently supplied by the low pass filter 14, the absolute value is obtained, the result is low pass filtered, and the value is compared to a minimum and stored before the next sample is processed. The processing rate of the samples through the DC canceller 12 and the low pass filter 14 and the sixty delayed samples processed between each sample as described above can be obtained because the structure is combined on the single chip illustrated in FIG. 6 and because of the novel combination of several arithmetic logic units into the single ALU 105. A more complete look into the ALU 105 is provided in FIG. 7.

Figure 7:
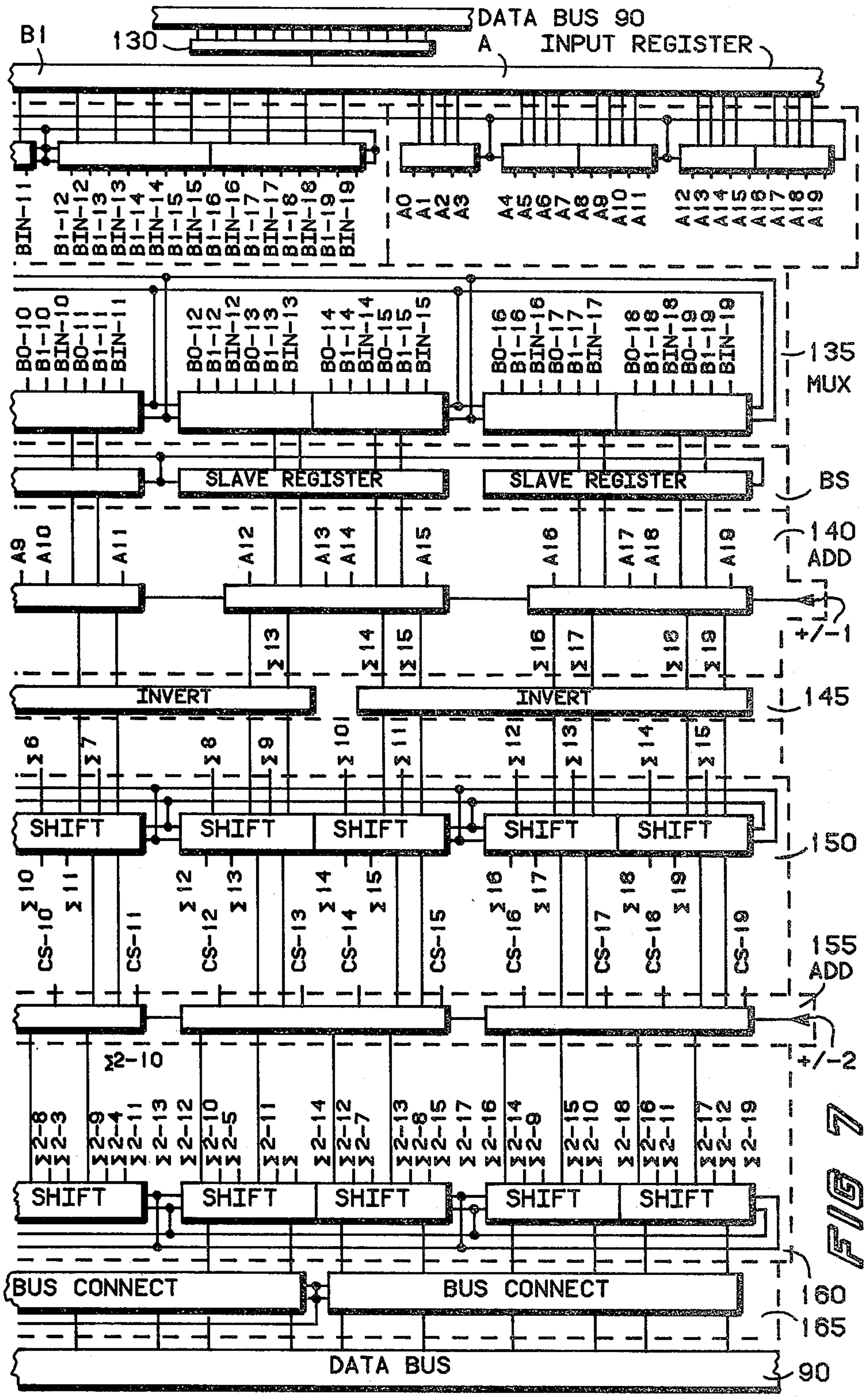
FIG. 7 is partial detailed blocked diagram of a portion of the block diagram of FIG. 6.

Referring specifically to FIG. 7, the various major components of the ALU 105 are illustrated as pluralities of separate components, or chips, for ease of understanding the operation thereof. Further, it will be understood by those skilled in the art that the ALU 105 could be constructed from a plurality of separate components, or chips, but the operation would be substantially slower and the size, cost and power consumption would be substantially greater. Accordingly, to facilitate the full understanding of the inner circuitry and operation of the major components, standard IC nomenclature will be used to describe the various pluralities of separate components and it should be understood that these IC's are used simply as examples of typical circuits similar to the actual chip construction.

A bus connect 130, in this embodiment made up of inverters 74LSO4, connect the data bus 90 to the input registers A, B1, B0, C1 and C0. In the illustration of FIG. 7 only a representative portion of the entire ALU 105 is illustrated and it will be understood that the removed portion is essentially a continuation of the portion shown. The complete input register A, made up of five 74LS175 four stage registers, is included. A portion of the B1 input register, made up of five 74LS75 four stage registers, is also included. Each of the registers of the B1 input register supplies four Q and four $\bar{Q}$ outputs. Similarly the B0, C1 and C0 input registers (not shown in FIG. 7) provide appropriate outputs for adding the positive or negative word stored therein. The Q and $\bar{Q}$ outputs from the B1 register and the outputs from the B0 register are applied through a multiplexing circuit (MUX) 135, in this embodiment made up of a plurality of 4×1 MUX components 74LS253, to the slave register BS. The C1 and C0 register outputs are similarly applied through similar multiplexing circuits to the slave register CS (not shown in FIG. 7). The outputs of the input register A and the slave register BS are applied to ADD circuit 140, in this embodiment made up of a plurality of ADD components 74LS283. Thus, the ADD circuit 140 supplies an output equivalent to A, A+B1, A−B1, or A−B0.

The outputs of the ADD circuit 140 are supplied to an inverter 145 which provides the 1's complement inversion that results in obtaining the absolute value of the outputs of the ADD circuit 140, as is well known to those skilled in the art. A plurality of multiplexing components, in this emodiment 74LS253, are connected as multiplexing/bit shifting circuits 150 and, upon receiving the appropriate signals from the sequencer 91, supply one of the unchanged signals from the ADD circuit 140, the absolute value of the signals from the ADD circuit 140, or either of these signals shifted by $2^5$ (÷32) or $2^6$ (÷64) bits at an output. The outputs of the circuits 150 are supplied along with outputs from the slave register CS to a second ADD circuit 155, made up in this embodiment of a plurality of ADD components 74LS283. The ADD circuits 140 and 155 operate simultaneously in this novel configuration. Since the solution in an ADD circuit such as 140 is obtained in a ripple-like result with the answer at the output of the first component on the right (FIG. 7) appearing first and then the second component, etc., once the output signal of the first component in ADD circuit 140 is available the second ADD circuit 155 can begin to operate. Thus, an output signal from the first component on the right of the second ADD circuit 155 is available at the same time as the output signal from the second component on the right in the first ADD circuit 140, etc. Therefore solutions to problems like A−B0+C0, see 37A and 37B in FIG. 4, can be obtained in a single operation.

The output signals from the ADD circuit 155 are applied to a plurality of inputs of a bit shifting circuit 160, which in this embodiment is a plurality of components designated 74LS253. Upon receiving the appropriate signals from the sequencer 91 the bit shifting circuit 160 provides, at an output, the output signal of the ADD circuit 155 unshifted, shifted $2^2$ bits (÷4), or shifted $2^7$ bits (÷128). The output signal of the bit shifting circuit 160 is supplied through bus connect circuit 165, in this embodiment a plurality of components 74LS367A, to the data bus 90.

Thus, an absolute magnitude difference function generator is disclosed which is sufficiently fast to process voice signals and which is sufficiently compact to form on a single semiconductor chip. While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. A high speed digital low pass filter comprising:

(a) a semiconductor chip;

(b) a data bus formed on said chip;

(c) a plurality of memory elements formed on said chip with each memory element of the plurality having a plurality of delay stages different than the plurality of delay stages for each of the other memory elements, and each of said plurality of memory elements having an input and an output operatively coupled to said bus;

(d) a plurality of storage devices formed on said chip and equal to the number of memory elements in said plurality of memory elements and each device being associated with a different one of said plurality of memory elements, each storage device having an input and an output operatively coupled to said bus;

(e) an arithmetic logic unit formed on said chip and having first, second and third inputs operatively coupled to said data bus, said logic unit further having an output for supplying signals equal to A±B±C, where A is a signal applied to the first input, B is a signal applied to the second input, and C is a signal applied to the third input; and (f) system control means formed at least partially on said chip for first connecting data words to be filtered to the first input of said logic unit and to the input of one of said plurality of memory elements by way of said data bus, connecting the output of the one of said plurality of memory elements to the second input of said logic unit by way of said data bus, and connecting the output of the associated one of said plurality of storage devices to the third input of said logic unit by way of said data bus, and second connecting the output of said logic unit to the input of the associated one of said plurality of storage devices, to the first input of said logic unit and to the input of a second one of said plurality of memory elements by way of said data bus, connecting the output of the second one of said plurality of memory elements to the second input of said logic unit by way of said data bus, and connecting the output of the storage device associated with the second memory element to the third input of said logic unit by way of said data bus, a low pass filtered data word being available at the output of the logic unit.

2. A low pass filter as claimed in claim 1 wherein the filter is constructed with a frequency response of approximately 1 kHz.

3. A low pass filter as claimed in claim 2 wherein the plurality of memory elements includes three shift registers which include three, four and five stages, respectively.

4. In a linear predictive coding voice processing system, an absolute magnitude difference function generator including the low pass filter of claim 1 and further including:

(a) A random access memory formed on the chip and having an input and an output operatively coupled to the data bus;

(b) memory control means at least partially formed on said chip and coupled to said random access memory for connecting the output of the logic unit to the input of said random access memory by way of said data bus to store low pass filtered data words in the memory in a predetermined sequence and for connecting the output of said random access memory to the first input of the logic unit to supply the stored low pass filtered data words to said logic unit in a predetermined sequence; and (c) an absolute value determining circuit formed within said logic unit and operatively coupling absolute values of low pass filtered data words from the output of said logic unit to said data bus in response to control signals from the system control means, each word in the predetermined sequence providing a separate absolute value output signal.

5. An absolute magnitude difference function generator as claimed in claim 4 wherein the system control means includes circuit means coupled to the memory control means for controlling the random access memory to provide the stored low pass filtered data in the form of a plurality of digital words each delayed by a different predetermined amount.

6. An absolute magnitude difference function generator as claimed in claim 5 wherein the words are delayed in approximately logarithmic steps within a range of approximately 2.5 milliseconds to 20 milliseconds.

7. An absolute magnitude difference function generator as claimed in claim 4 including in addition low pass filter means formed on the chip, coupled to the data bus and connected to the system control means for receiving the absolute value output signals from the absolute value determining circuits and supplying low pass filtered signals to the data bus in response to the system control means.

8. An absolute magnitude difference function generator as claimed in claim 7 wherein the low pass filter means includes estimated function storage means formed on the chip for storing a plurality of estimated functions equal in number to the absolute value signals, with an estimated function being associated with each absolute value signal and an input and an output operatively coupled to the data bus, bit shifting circuitry formed as a portion of the logic unit and controllable to provide predetermined bit shifts, and additional circuitry in the system control means for coupling the absolute value output signals from the absolute value determining circuits to the first input of the logic unit in the sequence in which they are produced, coupling estimated function signals from the output of the estimated function storage means to the second input of the logic unit, for causing a difference signal with the first input to be produced, and to the third input of the logic unit as the associated absolute value output signals are coupled to the first input of the logic unit, shifting the difference signals from the logic unit a predetermined amount in the bit shifting circuitry, and causing the logic unit to add the bit shifted difference signals to the estimated function signals to obtin an updated estimated function signal.

9. An absolute magnitude difference function generator as claimed in claim 4 wherein each of the second input of the logic unit and the third input of the logic unit include a temporary storage device for each different signal applied thereto and a multiplexing circuit for supplying the appropriate one of the different signals from the temporary storage devices upon receipt of a control signal from the system control means.

10. Low pass filtering a digital data signal comprising the steps of:

(a) providing an integrated circuit on a semiconductor chip including a data bus, a plurality of memory elements with each memory element of the plurality having a plurality of delay stages different than the plurality of delay stages for each of the other memory elements, a plurality of storage devices equal to the number of memory elements in said plurality and each device being associated with a different one of said plurality of memory elements, and an arithmetic logic unit for supplying signals equal to $A \pm B \pm C$, where A is a signal applied to a first input, B is a signal applied to a second input, and C is a signal applied to a third input;

(b) coupling the data signal by way of the data bus to the first input of the logic unit and to a first one of said plurality of memory elements;

(c) coupling the delayed signal from the first memory element by way of the data bus to the second input of the logic unit;

(d) coupling stored signals from the storage device associated with the first memory element by way of the data bus to the third input of the logic unit;

(e) coupling the output of the logic unit by way of the data bus to the storage device associated with the first memory element and to the first input of the logic unit and a second one of the plurality of memory elements;

(f) coupling the delayed signal from the second memory element by way of the data bus to the second input of the logic unit;

(g) coupling stored signals from the storage device associated with the second memory element by way of the data bus to the third input of the logic unit; and (h) coupling the output of the logic unit by way of the data bus to the storage device associated with the second memory element and to following circuitry.

11. In a linear predictive coding voice processing system, the method of providing an absolute magnitude difference function of a digital data signal comprising the steps of:

(a) providing an integrated circuit on a semiconductor chip including a data bus, a plurality of memory elements with each memory element of the plurality having a plurality of delay stages different than the plurality of delay stages for each of the other memory elements, a plurality of storage devices equal to the number of memory elements in said plurality and each device being associated with a different one of said plurality of memory elements, a random access memory, a plurality of estimated function storage circuits and a logic unit including subtracting and adding circuits, an absolute value determining circuit, and bit shifting circuitry;

(b) coupling the data signal by way of the data bus to the subtracting circuit and to a first one of said plurality of memory elements;

(c) coupling the delayed signal from the first memory element by way of the data bus to the subtracting circuit;

(d) coupling the output of the subtracting circuit to the adding circuit and coupling stored signals from the storage device associated with the first memory element by way of the data bus to the adding circuit;

(e) coupling the output of the adding circuit by way of the data bus to the storage device associated with the first memory element and to the subtracting circuit and a second one of the plurality of memory elements;

(f) coupling the delayed signal from the second memory element by way of the data bus to the subtracting circuit;

(g) coupling the output of the subtracting circuit to the adding circuit and coupling stored signals from the storage device associated with the second memory element by way of the data bus to the adding circuit;

(h) coupling the output of the adding circuit by way of the data bus to the storage device associated with the second memory element and to the subtracting circuit and a third one of the plurality of memory elements;

(i) coupling the delayed signal from the third memory element by way of the data bus to the subtracting circuit;

(j) coupling the output of the subtracting circuit to the adding circuit and coupling stored signals from the storage device associated with the third memory element by way of the data bus to the adding circuit;

(k) coupling the low pass filtered output of the adding circuits by way of the data bus to the storage device associated with the third memory element, to the subtracting circuit and to the random access memory for storing therein;

(l) selecting signals stored in the random access memory so as to provide a plurality of signals delayed by predetermined differing amounts and supplying each of the plurality of delayed signals by way of the data bus to the subtracting circuit to provide a plurality of difference signals;

(m) coupling each of the plurality of difference signals through the absolute value determining circuit and by way of the data bus to the subtracting circuit;

(n) coupling a stored estimated function from a dedicated function storage circuit for each of the plurality of difference signals by way of the data bus to the subtracting circuit and to the adding circuit;

(o) coupling each of the signals representing the difference between the absolute value and the estimated function from the subtracting means to the bit shifting circuitry;

(p) controlling the bit shifting circuitry to shift each of the difference representing signals by a predetermined number of shifts and coupling each of the shifted signals by way of the data bus to the adding circuit; and (q) coupling each of the signals from the adding circuit, representing each sum of the estimated function and the shifted signal associated therewith, by way of the data bus to an output of the integrated circuit.

12. A method as claimed in claim 11 wherein the first, second and third memory elements include shift registers provided with three, four and five stages, respectively.

* * * * *